United States Patent
Dallyn et al.

(10) Patent No.: US 9,702,104 B2
(45) Date of Patent: Jul. 11, 2017

(54) CONTROLLED CONTAINMENT BARRIER SYSTEM AND METHOD FOR USING SAME

(71) Applicant: North Shore Environmental Consultants Inc., Sherwood Park (CA)

(72) Inventors: Sherree Dallyn, Edmonton (CA); Calvin Murphy, Leduc (CA)

(73) Assignee: NORTH SHORE ENVIRONMENTAL CONSULTANTS INC., Sherwood Park, Alberta (CA)

( * ) Notice: Subject to any disclaimer, the term of this patent is extended or adjusted under 35 U.S.C. 154(b) by 0 days.

(21) Appl. No.: 14/875,159

(22) Filed: Oct. 5, 2015

(65) Prior Publication Data

US 2016/0097174 A1 Apr. 7, 2016

Related U.S. Application Data

(60) Provisional application No. 62/060,446, filed on Oct. 6, 2014.

(51) Int. Cl.
*E02B 8/04* (2006.01)
*E02B 3/04* (2006.01)
*E03B 3/04* (2006.01)

(52) U.S. Cl.
CPC ............ *E02B 3/04* (2013.01); *E02B 2201/02* (2013.01); *E03B 3/04* (2013.01)

(58) Field of Classification Search
USPC ..... 405/60, 80, 87, 103, 104, 107, 108, 114, 405/274, 278; 210/170.09, 170.1, 747.5; 137/236.1
See application file for complete search history.

(56) References Cited

U.S. PATENT DOCUMENTS

| | | | | |
|---|---|---|---|---|
| 1,943,933 A * | 1/1934 | Smith | ..................... | B21B 1/082 29/897.3 |
| 3,264,829 A * | 8/1966 | Broussard | ............... | E02B 13/02 251/147 |
| 3,872,007 A * | 3/1975 | Holland | ............... | B65D 90/046 210/114 |
| 5,316,174 A * | 5/1994 | Schutz | .................. | B29C 70/345 206/386 |
| 7,568,863 B2 * | 8/2009 | DeNardo | ................ | E02D 17/20 405/107 |
| 2003/0053869 A1* | 3/2003 | Moulin | ..................... | E02D 5/14 405/274 |
| 2005/0058514 A1* | 3/2005 | Moreau | ..................... | E02D 5/04 405/277 |

* cited by examiner

*Primary Examiner* — Sean Andrish
(74) *Attorney, Agent, or Firm* — Dentons US LLP; Brian R. McGinley; Heather M. Khassian

(57) ABSTRACT

A controlled containment barrier system is provided that can prevent the migration of dissolved phased contaminants in water systems. The system includes sheet piling installed in a body of water, the sheet piling having valves disposed at various vertical elevations on the sheet piling panels that allow the discharge of water at various strata in the body of water through the barrier system.

20 Claims, 8 Drawing Sheets

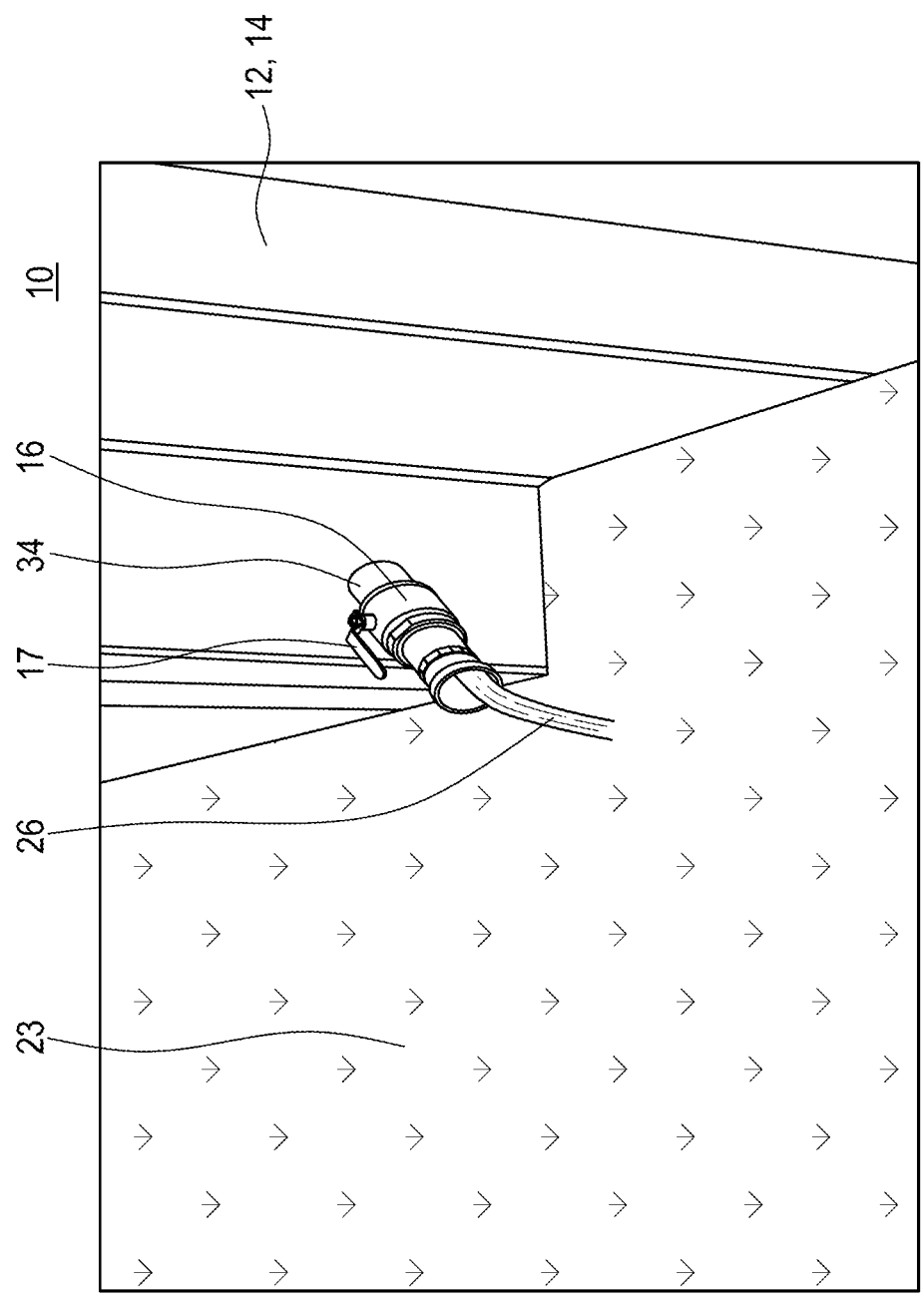

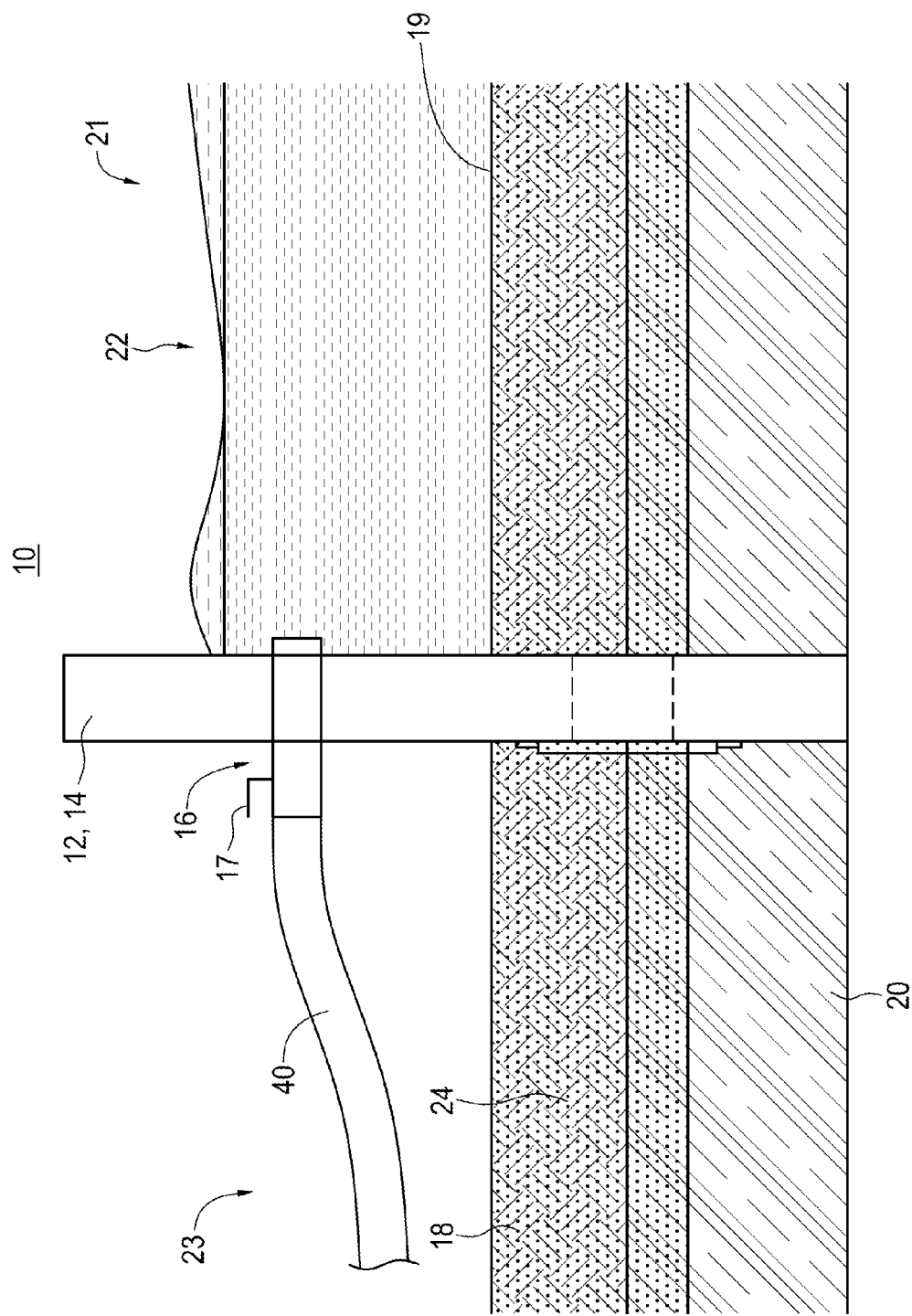

CONTROLLED CONTAINMENT BARRIER SYSTEM AND METHOD FOR USING SAME

CROSS-REFERENCE TO RELATED APPLICATIONS

This application claims priority of U.S. provisional patent application Ser. No. 62/060,446 filed Oct. 6, 2014, which is incorporated by reference into this application in its entirety.

TECHNICAL FIELD

The present disclosure is related to the field of sheet piling water containment systems, in particular, water containment systems that permit the draining of water at predetermined stratas in bodies of water contained by said systems.

BACKGROUND

Activities and occurrences such as the drilling of wells, pipeline failures or breaks, surface well blowouts, tanker truck roll-overs and other industrial activities can produce bodies of waters contaminated with foreign products such as hydrocarbons, produced water or with other chemicals, or contaminate existing water systems in areas surrounding these activities including, but not limited to, ponds, creeks, streams, wetlands, water bodies and watercourses.

It is, therefore, desirable to provide controlled containment barriers for use with such contaminated water systems to contain the contaminants and still allow uncontaminated water to flow through the barrier. Alternatively, it is desirable to provide controlled containment barriers that contain uncontaminated water yet be able to extract the contaminated water.

SUMMARY

A controlled containment barrier system is provided that can prevent the migration of dissolved phased contaminants. The system, in some embodiments, can isolate surface and subsurface flow while maintaining the ability to regulate water and/or contaminant movement.

In some embodiments, the system can comprise of interlocking barriers or sheet piling panels of various width, height, and material (metal, fiberglass, vinyl, or plastic) that can be set into an impermeable layer of soil with a portion of the panels disposed above the ground surface. In some embodiments, one or more of the panels can comprise a "Z-shaped profile". The amount of barrier above ground is based on fluid migration through a geographic area. The above ground portion of the barrier can control surface water flow and the below ground portion can control subsurface migration.

In some embodiments, regulating surface water flow is a key component of the system, wherein valves can be disposed in the barriers. In some embodiments, control valves can be disposed at various levels or predetermined elevations on the barrier panel that can be then used to control flow through the barrier as required. In some embodiments, the number of valves and levels at which they are installed can be based on potential water depth and flow velocities. In some embodiments, valves disposed near the center of the barrier, widthwise, can be placed closest to the ground surface to capture low water depths and volumes. As the water level increases so does the surface area of the flow path. Moving to the outside edges of the barrier, widthwise, the valves can be disposed increasingly higher on the barrier panels to safely and effectively control the larger volume of water. Any number and/or configuration of valves can be installed to optimize flow control. In some embodiments, hoses can be connected to the valves to divert water to a specified point downstream of the barrier.

In some embodiments, the controlled containment barriers can also be used to manage contaminants in surface water. Chloride impacted water, for example, has a higher density than fresh water and is typically found near the bottom of the water profile. In this situation, the lowest valves on the controlled containment barrier can be opened to allow chloride impacted water to pass through the bottom barrier where it can be captured. Alternatively, fresh water on the top of the water column can be released from the highest valves while maintaining containment of chloride impacted water disposed beneath the fresh water. In bodies of water contaminated with hydrocarbons, free-phased hydrocarbons generally sit on top of the water column. In this type of contamination scenario, the top valves would remain closed while allowing un-impacted water to flow through the lower valves.

Broadly stated, in some embodiments, a controlled containment barrier system can be provided for a body of water disposed on top of a permeable layer of soil, the permeable layer disposed on an impermeable layer of soil, the system comprising: a plurality of barrier panels configured to be placed in a side by side configuration across the body of water wherein a lower edge of the panels is further configured to be inserted through the permeable layer to the impermeable layer; and at least one valve mechanism disposed on at least one of the plurality of barrier panels, the at least one valve mechanism configured to operated from a closed position, wherein water or other fluids are prevented from flowing through the barrier system, to an open position, wherein water or other fluids can flow through the barrier system.

Broadly stated, in some embodiments, an improved controlled containment barrier system can be provided for a body of water disposed on top of a permeable layer of soil, the permeable layer disposed on an impermeable layer of soil, the system comprising a plurality of barrier panels configured to be placed in a side by side configuration across the body of water wherein a lower edge of the panels is further configured to be inserted through the permeable layer to the impermeable layer, the improvement comprising: at least one valve mechanism disposed on at least one of the panels, the at least one valve mechanism configured to operated from a closed position, wherein water is prevented from flowing through the barrier system, to an open position, wherein water can flow through the barrier system.

Broadly stated, in some embodiments, the at least one valve mechanism can be disposed at a predetermined elevation on the plurality of barrier panels.

Broadly stated, in some embodiments, the at least one valve mechanism can comprise a ball valve.

Broadly stated, in some embodiments, the valve mechanism can further comprise a valve nipple installed on at least one of the plurality of barrier panels, the valve nipple configured to releasably receive the ball valve.

Broadly stated, in some embodiments, the at least one valve mechanism can comprise a gate valve.

Broadly stated, in some embodiments, the gate valve can be configured for operating in the permeable layer of soil.

Broadly stated, in some embodiments, each of the plurality of barrier panels can comprise a pair of opposing substantially parallel and vertical side edges, the side edges further comprising means for interlocking adjacent barrier panels together.

Broadly stated, in some embodiments, a method can be provided for allowing uncontaminated water to flow through a controlled containment barrier system for a body of water disposed on top of a permeable layer of soil, the permeable layer disposed on an impermeable layer of soil, the method comprising the steps of: providing the controlled containment barrier system, the system comprising: a plurality of barrier panels configured to be placed in a side by side configuration across the body of water wherein a lower edge of the panels is further configured to be inserted through the permeable layer to the impermeable layer, and at least one valve mechanism disposed on at least one of the plurality of barrier panels, the at least one valve mechanism configured to operated from a closed position, wherein water is prevented from flowing through the barrier system, to an open position, wherein water can flow through the barrier system; closing at least one of the valve mechanisms disposed at a first elevation substantially horizontally adjacent to a first strata of water disposed in the body of water, the first strata of water further comprising contaminated water; and opening at least one of the valve mechanisms disposed at a second elevation substantially horizontally adjacent to a second strata of water disposed in the body of water, the second strata of water further comprising the uncontaminated water.

Broadly stated, in some embodiments, the method can further comprise the step of connecting at least one hose to at least one of the opened valve mechanisms to direct a flow of uncontaminated water away from the controlled containment barrier system.

BRIEF DESCRIPTION OF THE DRAWINGS

FIG. 7 is a front perspective view depicting the valve of FIG. 6.

FIG. 8 is a side elevation view depicting the controlled containment barrier of FIG. 1 discharging uncontaminated water from a body of water through a hose to a location downstream of the barrier.

DETAILED DESCRIPTION OF EMBODIMENTS

A controlled containment barrier for bodies of water containing contaminated water, and a method for using same, is provided. In areas where drilling of wells is taking place, in particular, the drilling of hydrocarbon producing wells, as well as other activities and occurrences such as pipeline breaks, surface well blowouts, tanker truck rollovers and other industrial activities, surrounding water systems can become contaminated with chemicals, such as chloride-impacted water that is heavier than uncontaminated water, or contaminated with hydrocarbons that are lighter than uncontaminated water. The soil in these areas can comprise a layer of permeable soil overlaid on top of a layer of impermeable soil.

For the purposes of this description and the claims herein, the term "permeable soil" is defined as including sand, gravel and organic soil. The term "organic soil" is defined as including root vegetation, bogs, peat lands, fen, "muskeg" and wetlands. The term "impermeable soil" is defined as including clay, marl, fine-textured soils and bedrock.

Figure 1:
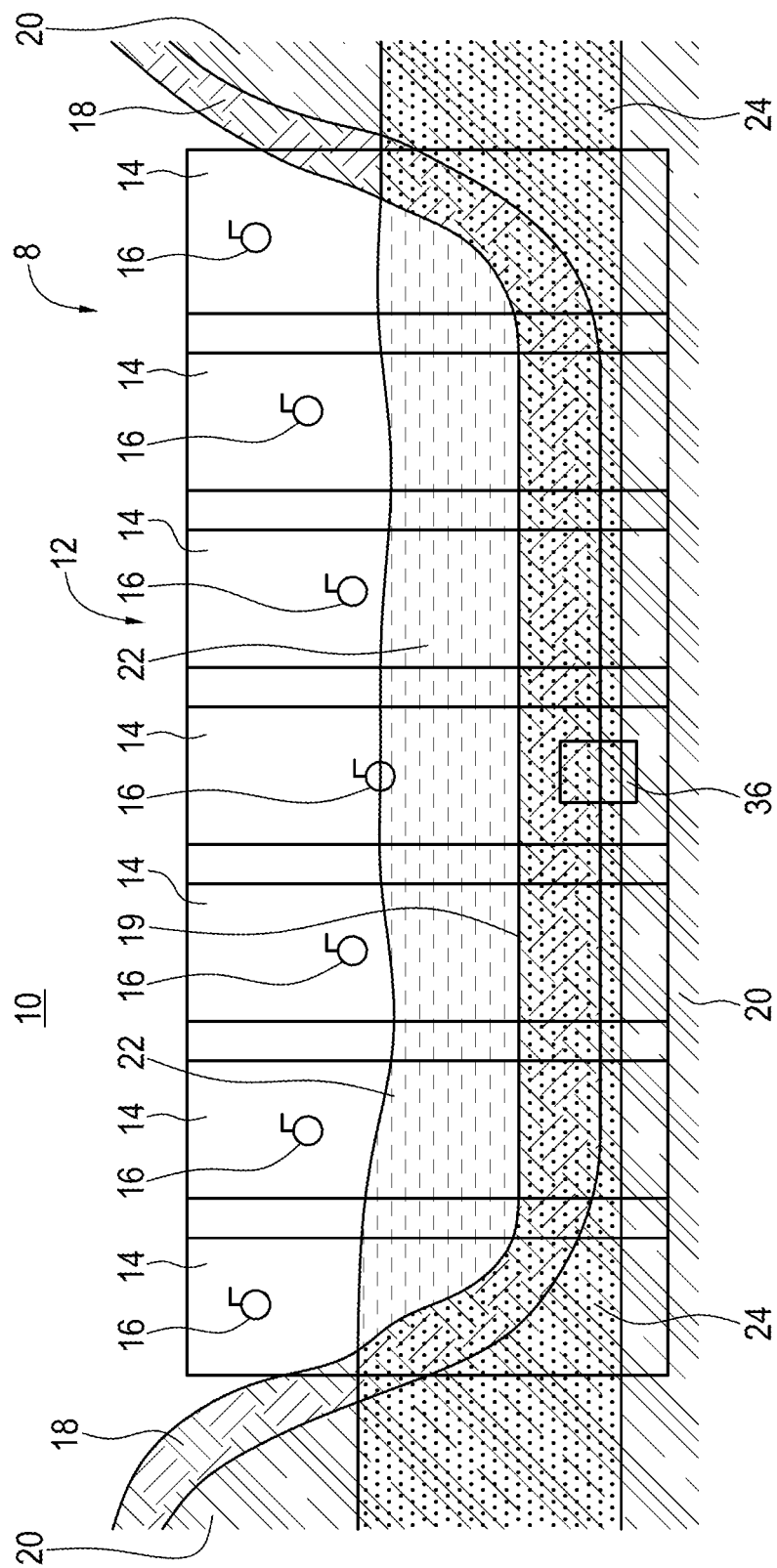
FIG. 1 is a downstream elevation view depicting one embodiment of a controlled containment barrier installed in a body of water.
Figure 2:
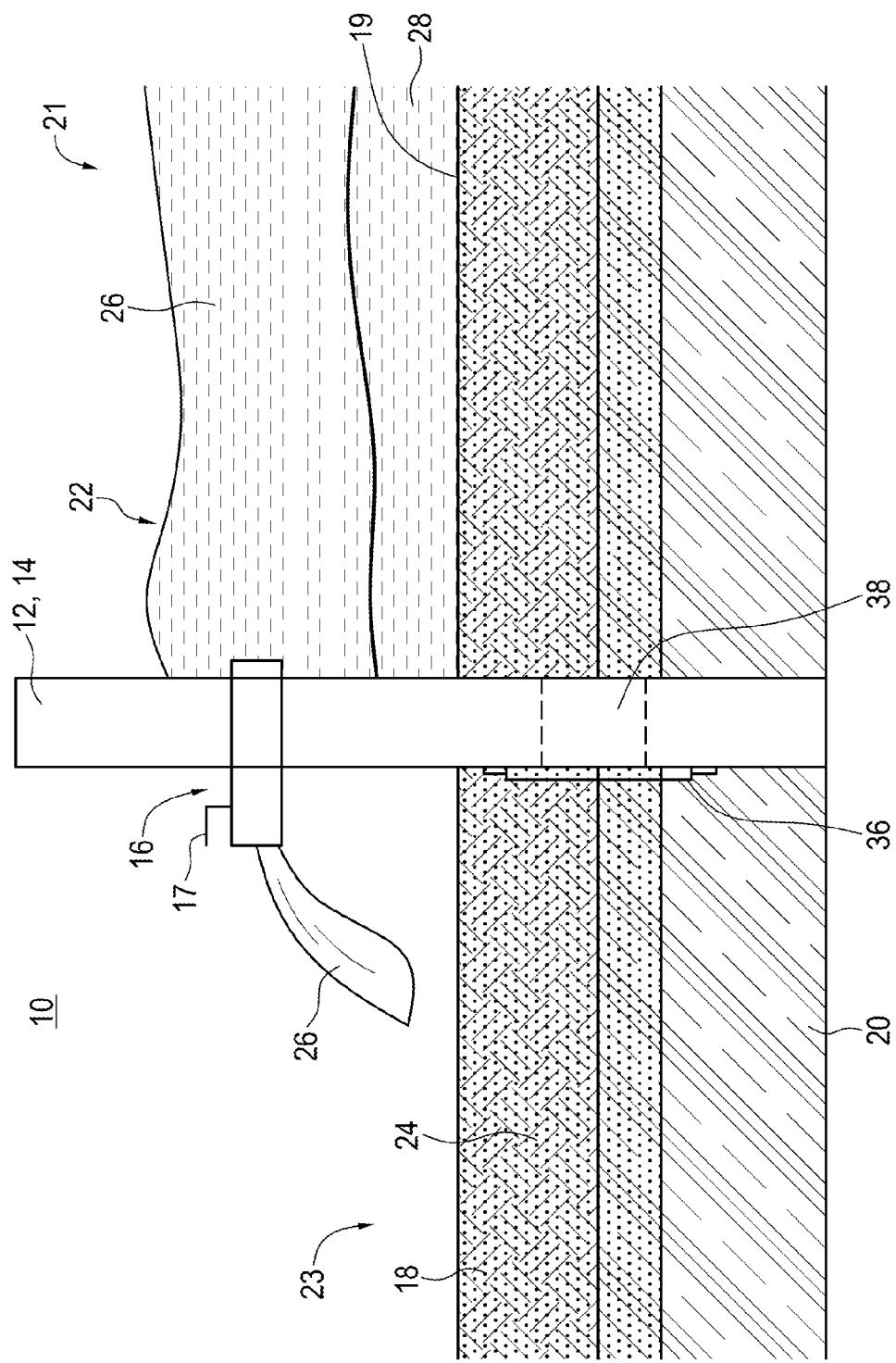
FIG. 2 is a side elevation view depicting the controlled containment barrier of FIG. 1 discharging uncontaminated water from a body of water containing contaminated water that has settled beneath the uncontaminated water.
Figure 3:
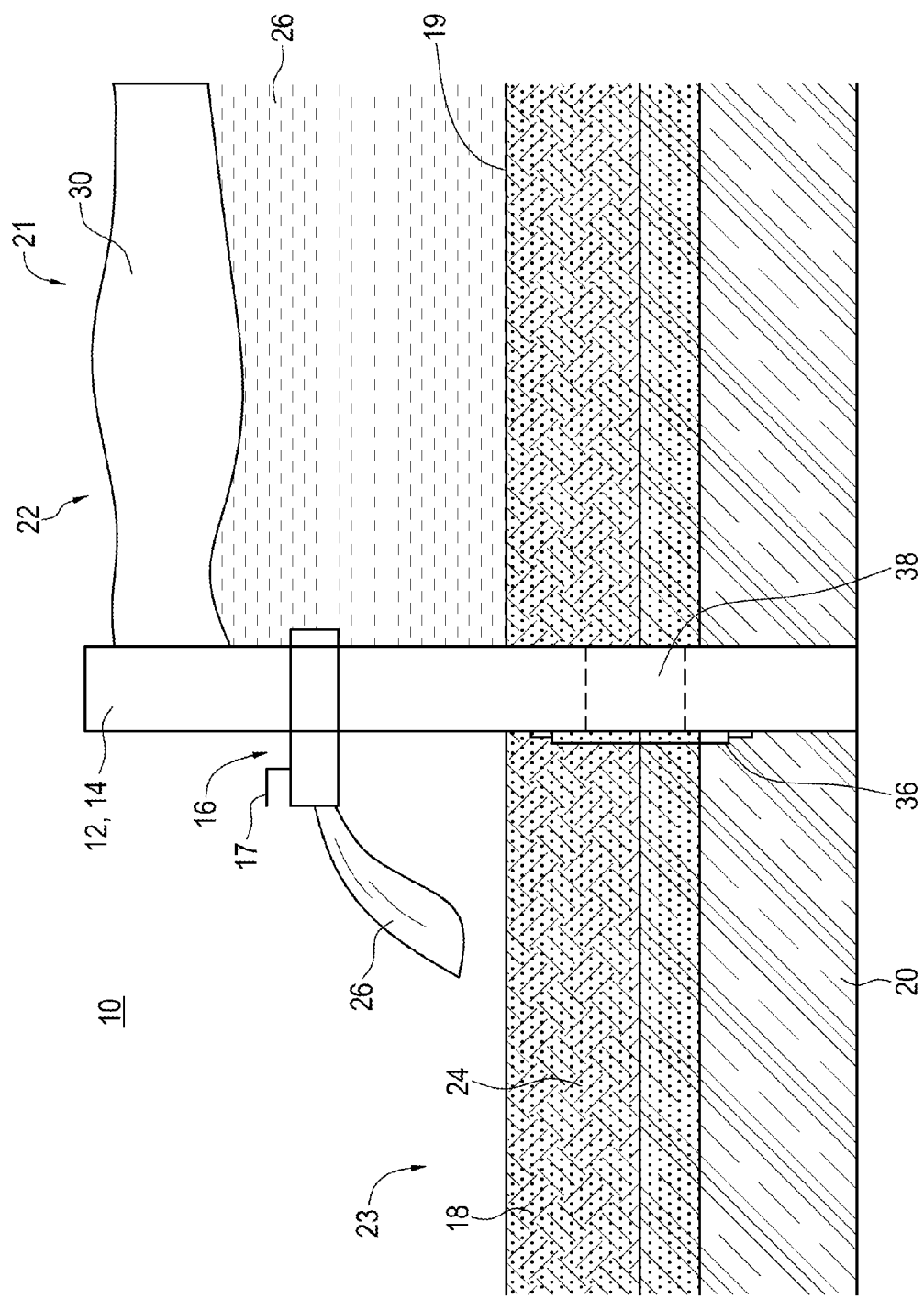
FIG. 3 is a side elevation view depicting the controlled containment barrier of FIG. 1 discharging uncontaminated water from a body of water containing contaminated water that has settled above the uncontaminated water.
Figure 4:
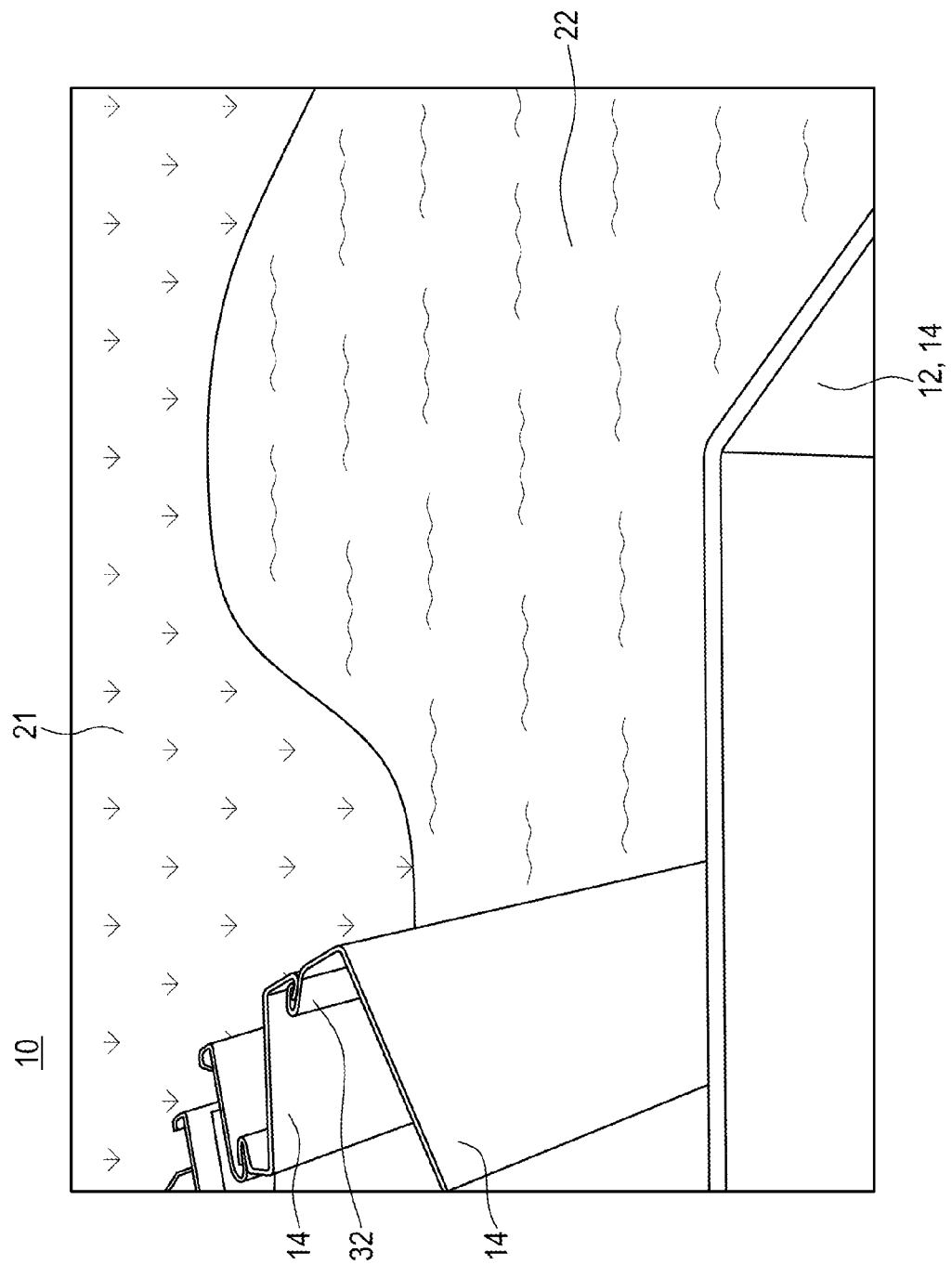
FIG. 4 is a perspective view depicting surface water contained by another embodiment of a controlled containment barrier.

Referring to FIGS. 1, 2 and 3, one embodiment of controlled containment barrier system 10 is illustrated. In some embodiments, system 10 can comprise sheet piling 12 placed across body of water 22 disposed in depression 8. In some embodiments, sheet piling 12 can comprise a plurality of sheet pile or barrier panels 14 interconnected or interlocked together in a side-by-side arrangement, as well known to those skilled in the art, using interlocking tongue and groove mechanisms, identified by reference numeral "32" in FIG. 4, to build sheet piling 12 across any desired width of body of water 22. In some embodiments one or more panels 14 can comprise a "Z-shaped profile", as illustrated in FIG. 4. For the purposes of this description and the claims herein, the term "body of water" is defined as including creeks, streams, rivers, ponds, lakes, bogs, swamps, muskeg, wetlands, water bodies, watercourses and spillways.

In some embodiments, barrier panels 14 can be inserted through permeable layer of soil 18 to impermeable layer of soil 20. When impermeable layer 20 is comprised of clay or marl, barrier panels 14 can be inserted into impermeable layer such that the lower edges of panels extend below saturated zone 24, the region of soil below ground level that is saturated with water, which can further extend through permeable layer 18 into impermeable layer 20 depending on the ground and soil conditions.

In some embodiments, system 10 can comprise at least one valve 16 disposed on at least one panel 14. In some embodiments, valves 16 can be disposed at various vertical elevations on panels 14, wherein valves 16 are located above top surface 19 of permeable layer 18 and further configured to open and, thus, allow water to flow from upstream side 21 to downstream side 23 of system 10. In some embodiments, valves 16 can be placed lower in elevation on panels 14 nearer the horizontal center of body of water 22, and can be placed higher in elevation on panels 14 nearer the edges of body of water 22. In some embodiments, valves 16 can comprise standard 4-inch ball valves, as well known to those skilled in the art. In some embodiments, system 10 can comprise at least one gate valve 36, which can be disposed on panels 14 such that they are located in saturated zone 24 below top surface 19. Gate valves 36 can be used to allow the flow of water in saturated zone 24 below top surface 19 from upstream side 21 through opening 38 disposed through sheet piling 12 to downstream side 23. Gate valves 36 can be used in this functionality as they are more easily inserted through permeable layer 18 than ball valves can be.

Referring to FIG. 2, body of water 22 is shown having layer of uncontaminated water 26 disposed above contaminated layer of water 28, which is heavier due to concentration of chemicals such as chlorides. In this situation, valve 16 can be disposed on barrier panel 14 at an elevation that is adjacent to uncontaminated layer 26 whereupon opening valve 16, uncontaminated water can be discharged from body of water 22 to downstream side 23.

Referring to FIG. 3, body of water 22 is shown having layer of uncontaminated water 26 disposed below contaminated layer of water 30, which is lighter due to concentration of hydrocarbons. In this situation, valve 16 can be disposed on barrier panel 14 at an elevation that is adjacent to uncontaminated layer 26 whereupon opening valve 16, uncontaminated water can be discharged from body of water 22 to downstream side 23.

Figure 5:
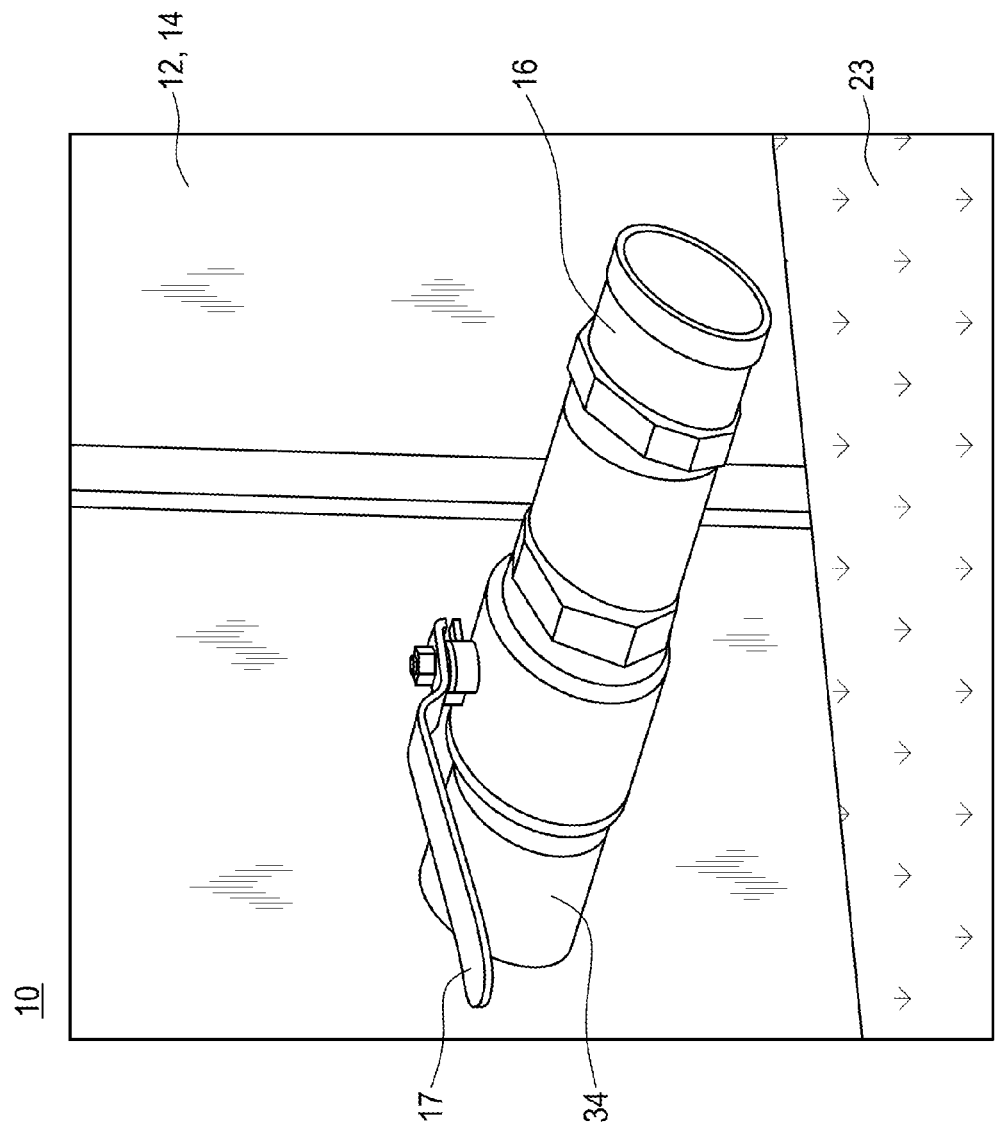
FIG. 5 is a perspective view depicting a valve disposed on a downstream side of the controlled containment barrier of FIG. 4, the valve in a closed position.

Referring to FIGS. 4, 5, 6 and 7, another embodiment of system 10 is illustrated. In FIG. 4, sheet piling 12 is shown comprised of a plurality of Z-shaped profile barrier panels 14 joined together at interlocking joint 32, and containing body of water 22 on upstream side 21 of sheet piling 12. As illustrated in FIG. 4, interlocking joint 32 can comprise of each side edge of adjacent panels 14 further comprising a "J-shaped" profile, which can thus provide both a "tongue" and a "groove" mechanism to enable the "tongue" of one panel 14 to hook or insert into the "groove" of an adjacent panel 14, and vice versa, to interlock the adjacent panels 14 together. In FIG. 5, downstream side 23 of system 10 is shown. In this figure, valve 16 is shown with valve handle 17 turned to a substantially perpendicular position relative to the axis of valve 16 thus indicating that valve 16 is closed. In some embodiments, openings can be cut through barrier panels 14 and have valve nipples 34 welded thereon so that valves 16 can be threadable attached thereto. This enables valves 16 to be easily removed for repair or be replaced.

Figure 6:
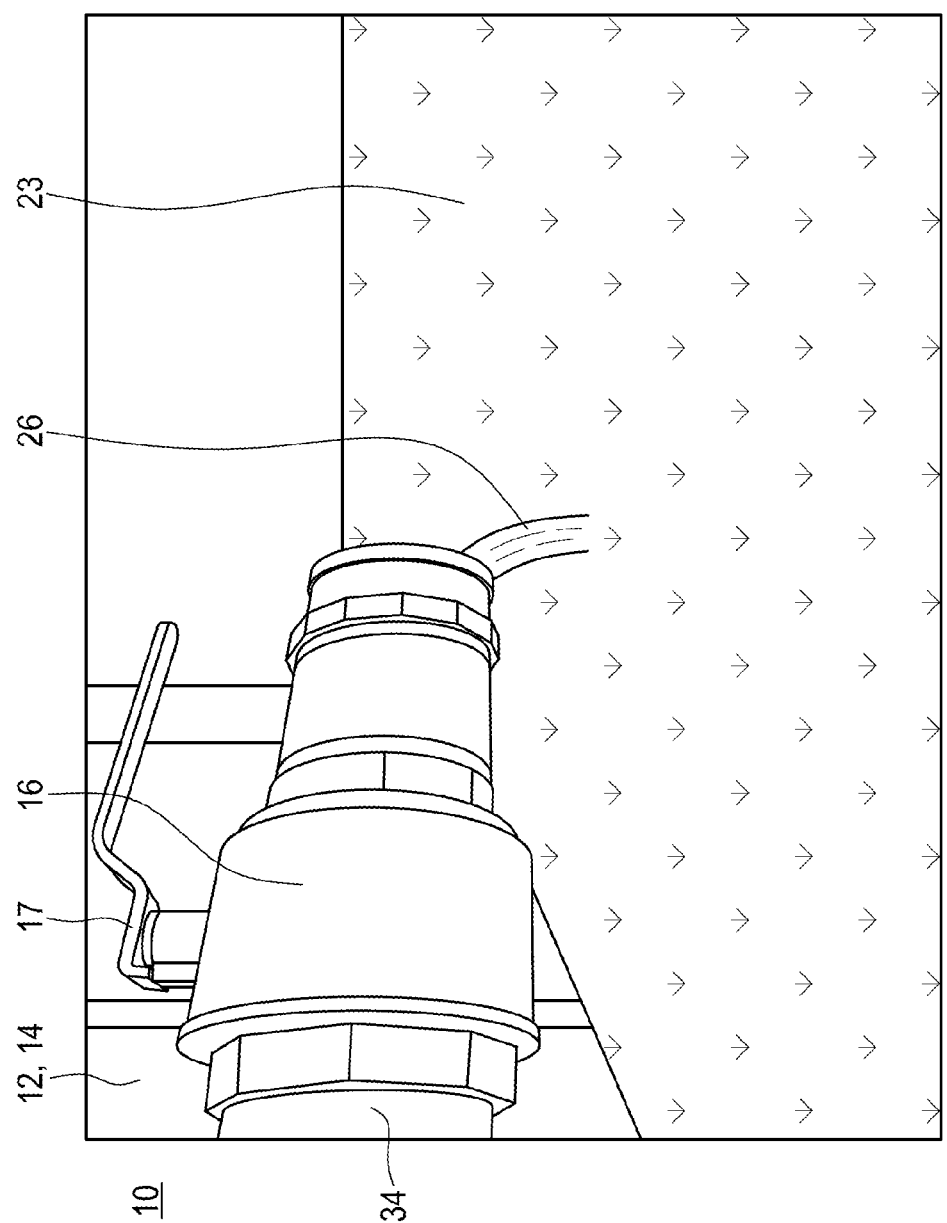
FIG. 6 is a side perspective view depicting the valve of FIG. 5 in an open position, wherein uncontaminated water is being discharged.

Referring to FIGS. 6 and 7, valve 16 is shown with valve handle positioned substantially parallel with the axis of valve 16 thus indicating that valve 16 is open and letting a flow of uncontaminated water 26 to flow to downstream side 23 of sheet piling 12.

Referring to FIG. 8, hose 40 is attached to valve 16 to allow the flow water away from downstream side 23. In some embodiments, uncontaminated water 26 can be discharged from body of water 22 through hose 40 to a location further downstream of sheet piling 12 as a means to keep downstream side 23 dry, such as may be required for excavation purposes. In other embodiments, hose 40 can be used to collect contaminated water from body of water 22 where hose 40 is connected to a tank to hold the contaminated water and/or to a pump that can move the contaminated water to a tanker truck so that the contaminated water can be trucked away for treatment or disposal.

Field Trial Results

In June 2014, two controlled containment barriers were installed to control fresh water flow from a watercourse into a spill path. In this situation, controlling the amount of water flowing into the spill path is imperative to remediation operations. In one installation, during excavation activities, the spill path needed to be dry. At that time, all of the valves on the controlled containment barrier were closed to prevent water from flowing into the excavation area. After excavation activities were complete, the valves on the controlled containment barrier were opened to allow fresh water to enter the remaining impact area to assist with remediation activities.

In the second installation, the barriers were installed in a bog and fen complex to manage the movement of chloride and surface water. At this site, chloride-impacted water was trapped in vegetation and organic soil. The controlled containment barriers function was to prevent the chlorides from migrating down gradient into open water wetlands. Additionally, the barriers provide containment to segregate impacts into manageable compartments without losing containment. During high precipitation events, or spring freshet, un-impacted surface water can be released through the controlled containment barriers into the down gradient open water wetlands to maintain the integrity of ecosystem.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A controlled containment barrier system for a body of water disposed on top of a permeable layer of soil, the permeable layer disposed on an impermeable layer of soil, the system comprising:
    a) a plurality of interlocking sheet piling panels for placing in a side by side configuration across the body of water, each of the interlocking sheet piling panels comprising a lower edge for inserting through the permeable layer to the impermeable layer, wherein each of the plurality of interlocking sheet piling panels comprises a pair of opposing substantially parallel and vertical side edges, each of the side edges further comprising both a tongue and a groove mechanism;
    b) at least one first valve mechanism disposed on at least one of the plurality of interlocking sheet piling panels at a first elevation above the permeable layer; and
    c) at least one second valve mechanism disposed on at least one of the plurality of interlocking sheet piling panels, wherein the at least one second valve mechanism is disposed at least partially in the permeable layer, the at least one second valve mechanism configured for controlling a flow of water in the permeable layer passing therethrough.

2. The system as set forth in claim 1, further comprising at least one third valve mechanism disposed on the plurality of interlocking sheet piling panels at a second elevation above the permeable layer.

3. The system as set forth in claim 2, wherein one or both of the at least one first valve mechanism and the at least one third valve mechanism comprises at least one ball valve.

4. The system as set forth in claim 3, wherein one or both of the at least one first valve mechanism and the at least one third valve mechanism further comprises at least one valve nipple releasably coupling the at least one ball valve to at least one of the plurality of interlocking sheet piling panels.

5. The system as set forth in claim 2, wherein the at least one second valve mechanism further comprises a gate valve.

6. The system as set forth in claim 1, wherein each of the plurality of interlocking sheet piling panels comprises a Z-shaped profile.

7. An improved controlled containment barrier system for a body of water disposed on top of a permeable layer of soil, the permeable layer disposed on an impermeable layer of soil, the system comprising a plurality of interlocking sheet piling panels placed in a side by side configuration across the body of water, each of the interlocking sheet piling panels comprising a lower edge for inserting through the permeable layer to the impermeable layer, wherein each of the plurality of interlocking sheet piling panels comprises a pair of opposing substantially parallel and vertical side edges, each of the side edges further comprising both a tongue and a groove mechanism, the improvement comprising: at least one first valve mechanism disposed on at least one of the interlocking sheet piling panels at a first elevation above the permeable layer; and at least one second valve mechanism disposed on at least one of the plurality of interlocking sheet piling panels, wherein the at least one second valve mechanism is disposed at least partially in the permeable layer, the at least one second valve mechanism configured for controlling a flow of water in the permeable layer passing therethrough.

8. The improved system as set forth in claim 7, further comprising at least one third valve mechanism disposed on the plurality of interlocking sheet piling panels at a second elevation above the permeable layer.

9. The improved system as set forth in claim 8, wherein one or both of the at least one first valve mechanism and the at least one third valve mechanism comprises at least one ball valve.

10. The improved system as set forth in claim 9, wherein one or both of the at least one first valve mechanism and the at least one third valve mechanism further comprises at least one valve nipple releasably coupling the at least one ball valve to at least one of the plurality of interlocking sheet piling panels.

11. The improved system as set forth in claim 8, wherein the at least one second valve mechanism further comprises a gate valve.

12. The improved system as set forth in claim 7, wherein each of the plurality of interlocking sheet piling panels comprises a Z-shaped profile.

13. A method for allowing uncontaminated water to flow through a controlled containment barrier system for a body of water disposed on top of a permeable layer of soil, the permeable layer disposed on an impermeable layer of soil, the method comprising the steps of:
   a) providing the controlled containment barrier system, the system comprising:
      i) a plurality of interlocking sheet piling panels placed in a side by side configuration across the body of water, each of the interlocking sheet piling panels comprising a lower edge inserted through the permeable layer to the impermeable layer, wherein each of the plurality of interlocking sheet piling panels comprises a pair of opposing substantially parallel and vertical side edges, each of the side edges further comprising both a tongue and a groove mechanism joining adjacent panels together,
      ii) at least one first valve mechanism disposed on at least one of the plurality of interlocking sheet piling panels at a first elevation above the permeable layer,
      iii) at least one second valve mechanism disposed on at least one of the plurality of interlocking sheet piling panels at a second elevation above the permeable layer, and
      iv) at least one third valve mechanism disposed on at least one of the plurality of interlocking sheet piling panels, wherein the at least one third valve mechanism is disposed at least partially in the permeable layer;
   b) closing the at least one first valve mechanism disposed at the first elevation substantially horizontally adjacent to a first strata of water disposed in the body of water, the first strata of water further comprising contaminated water; and
   c) opening the at least one second valve mechanism disposed at the second elevation substantially horizontally adjacent to a second strata of water disposed in the body of water, the second strata of water further comprising the uncontaminated water.

14. The method as set forth in claim 13, wherein one or both of the at least one first valve mechanism and the at least one second valve mechanism comprises at least one ball valve.

15. The method as set forth in claim 14, wherein one or both of the at least one first valve mechanism and the at least one second valve mechanism further comprises at least one valve nipple releasably coupling the at least one ball valve to at least one of the plurality of interlocking sheet piling panels.

16. The method as set forth in claim 13, wherein the at least one third valve mechanism further comprises a gate valve.

17. The method as set forth in claim 13, wherein each of the plurality of interlocking sheet piling panels comprises a Z-shaped profile.

18. The method as set forth in claim 13, further comprising the steps of connecting at least one hose to the at least one second valve mechanism and directing a flow of uncontaminated water away from the controlled containment barrier system.

19. The method as set forth in claim 13, further comprising the step of opening the at least one third valve mechanism thereby permitting water in the permeable layer to flow therethrough.

20. The method as set forth in claim 13, further comprising the step of closing the at least one third valve mechanism thereby preventing water in the permeable layer to flow therethrough.

* * * * *